United States Patent Office 2,869,970
Patented Jan. 20, 1959

2,869,970
TANNING WITH EPOXY RESINS

Edward M. Filachione and Edward H. Harris, Jr., Philadelphia, Pa., assignors to the United States of America as represented by the Secretary of Agriculture No Drawing. Application April 11, 1957
Serial No. 652,324

6 Claims. (Cl. 8—94.33)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for preparing new and novel leather products.

An object of this invention is to provide a process for preparing a leather having new and improved properties, in particular a white leather that resists detanning by the action of water, acids, alkalies and organic solvents. Another object is to provide certain epoxy resins as novel tanning agents.

These epoxy resins are a new class of condensation polymers which may be defined in the present instance as condensation products of epichlorohydrin with 2,2-bis(4-hydroxyphenyl)propane, commonly known as bis-phenol. These polymeric products are generally not a single simple molecule but a complex mixture of glycidyl polyethers of the general formula:

$$CH_2\!\!-\!\!CH\!\!-\!\!CH_2\!\!-\!\!O\!\!-\!\!(R\!\!-\!\!O\!\!-\!\!CH_2\!\!-\!\!CHOH\!\!-\!\!CH_2\!\!-\!\!O)_n\!\!-\!\!R\!\!-\!\!O\!\!-\!\!CH_2\!\!-\!\!CH\!\!-\!\!CH_2$$
$$\underset{O}{\diagdown\!\!\diagup} \qquad\qquad\qquad\qquad\qquad\qquad\qquad\qquad\qquad\qquad \underset{O}{\diagdown\!\!\diagup}$$
I wherein R is a divalent hydrocarbon radical of

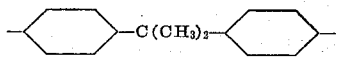

$$CH_2\!\!-\!\!CH\!\!-\!\!CH_2\!\!-\!\!O\,(\!\!-\!\!R\!\!-\!\!O\!\!-\!\!CH_2\!\!-\!\!CHOH\!\!-\!\!CH_2\!\!-\!\!O)_n\!\!-\!\!R\!\!-\!\!O\!\!-\!\!CH_2\!\!-\!\!CH\!\!-\!\!CH_2$$

derived from bis-phenol, and $n$ is an integer having an average value of the series 0, 1, 2, 3, etc. up to 10, inclusive. The length of the chain can be made to vary by changing the molecular proportion of epichlorohydrin and bis-phenol. In general, these glycidyl polyethers, having an epoxy equivalency between one and two, contain terminal 1,2-epoxy groups and have alternate aliphatic and aromatic nuclei linked together by ether oxygen atoms. The term epoxy equivalency refers to the number of 1,2-epoxy groups

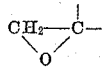

contained in the average molecule of the glycidyl polyether.

These glycidyl polyethers are a complex mixture of compounds believed to contain as the principal component a substance which may be represented by the formula wherein $n$ is an integer having an average value of 0, 1, 2, 3, etc. up to 10, inclusive. They have a 1,2-epoxy equivalency between 1.0 and 2.0, as well as, preferably, a molecular weight between 340 and 3000, and an equivalent weight as an epoxide between 150 and 1500. The equivalent weight as an epoxide is the weight of glycidyl polyether per epoxide group. Such glycidyl ethers can be prepared by interaction between epichlorohydrin, bis-phenol, and alkali as described in the patent literature, for instance, U. S. Patent No. 2,681,901.

We have discovered that the epoxy resins discussed above can be used successfully in tanning hides and skins. The success of our tanning process is effected by the solvent system in which the epoxy resin is dissolved and by the pH of the tanning medium. Suitable solvent mixtures are composed of water miscible organic solvents containing a minor proportion, preferably about 4 to 35%, of water. Within this range all of the epoxy resins of the present invention are operative at a water content of 4 to 10% and the presence of this water, while not critical to the tanning process, does reduce the time required for tanning a hide. As mutual solvents for water and the epoxy resins the mono-ethers of ethylene glycol, propylene glycol, diethylene glycol and dipropylene glycol, all inert as far as known tanning effects are concerned, are particularly useful in our process.

The process is operative under alkaline conditions, preferably in a pH range of 7 to 12.

Our preferred process of tanning hides, as cowhide, calfskin, or other hides commonly used for tannage, comprises treating the hides with an alkaline solution, as that resulting from the addition of about 0.5% of sodium carbonate or lime, containing about 4 to 10% water, a water-miscible organic solvent such as the mono-ethers of ethylene glycol, propylene glycol, diethylene glycol, or dipropylene glycol, and a glycidyl polyether of bis-phenol corresponding to the formula

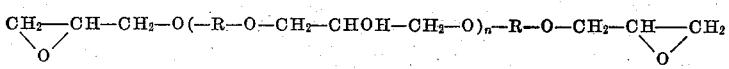

wherein R is a divalent hydrocarbon radical of the formula

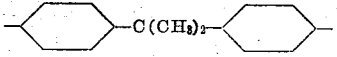

derived from bis-phenol and $n$ is an integer having an average value ranging from 0 to 10 inclusive.

The leather product obtained by tanning by our process is a white leather throughout its entire thickness in contrast to bleached and/or pigmented conventional white leathers. Another advantage of the leather produced by our process is the high degree of resistance to detannage by means of acids, alkalis, organic solvents and other agents which show a detanning action towards conventional mineral and vegetable tanned leathers. A further advantage of the process of our invention is that inorganic salts are not necessary to control the plumping action on the hide or skin; this action can be controlled by altering the ratio of water to organic solvent.

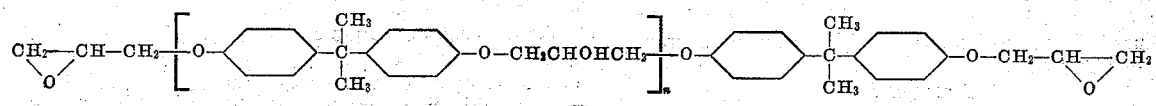

II

An important advantage of treating hides by the process of our invention is that a chemical interaction occurs between the hide and the glycidyl polyether of bis-phenol and it is believed that an extremely stable covalent bond is established as a result of such an interaction. This process thus not only results in a tanning action but in effect produces a stable derivative of collagen, which is the main component of animal hides. Thus our process is valuable not only for tanning of hides but for preparing a derivative of animal hide which can be further treated, as for example with conventional mineral or vegetable tanning agents.

The practice of the invention is illustrated by the following examples. In these examples the hides used were prepared for tanning as follows: A grain split steerhide, split out of the lime, was delimed by agitating with a sodium acetate-acetic acid buffer solution for about 4 hours. This solution was replaced by a fresh sodium acetate-acetic acid buffer and the treatment repeated. The solution, the pH of which was now 5.3, was drained and the steerhide washed thoroughly in running water. The hide was then cut into smaller pieces and dehydrated by immersion (and occasionally agitation) in 3 changes of acetone. The pieces were then blotted to absorb the gross amount of solvent and the remaining solvent permitted to slowly evaporate from the acetone dehydrated hide.

*Example 1*

Pieces of the acetone dehydrated hide, amounting to about 15 grams, were placed in a solution prepared as follows: 10 grams of a glycidyl polyether of bis-phenol, described below, were dissolved in 90 ml. of ethylene glycol monomethyl ether (methyl Cellosolve) then 10 ml. of water and 0.5 g. of sodium carbonate were added to this solution. The hide in contact with this solution was gently agitated for six days at room temperature. At the end of this time the hide under treatment was removed and washed free of excess glycidyl polyether by immersion in two changes of acetone and then washed in running water for one day. The shrinkage temperature of this product was 81° C. as compared to a shrinkage temperature of 60° C. for the untreated hide. The treated hide was permitted to dry in air and a white flexible leather product was obtained. This leather was not detanned by immersion in dilute acids, dilute alkalies, or organic solvents.

The glycidyl polyether of bis-phenol used in this example was obtained by the condensation of epichlorohydrin with bis-phenol as described in the patent literature, for example "Polyether A" in U. S. Patent 2,643,239. The glycidyl polyether of bis-phenol had a Durrans' mercury method softening point of 8–12° C., an equivalent weight as an epoxide of between 190 and 210, and its composition corresponded to the general Formula II above in which $n$ has an average value of about zero.

*Example 2*

The procedure of Example 1 was repeated except that the glycidyl polyether of bis-phenol was replaced by a polyether of higher molecular weight. The leather product was substantially similar to that produced in Example 1.

The glycidyl polyether of bis-phenol used in this experiment was an epoxy resin obtained by the condensation of epichlorohydrin with bis-phenol as described in the patent literature, for example "Polyether B" in U. S. Patent 2,643,239. The glycidyl polyether had a softening point of 20–28° C. as determined by Durrans' mercury method, an equivalent weight as an epoxide of between 225 and 290, and its composition corresponded to the general Formula II above in which $n$ has an average value of about one.

*Example 3*

The procedure of Example 1 was repeated except that diethylene glycol monoethyl ether ("Carbitol") was used in place of methyl "Cellosolve" as the water containing organic solvent. In this example, solution of the glycidyl polyether of bis-phenol was carried out as follows: 10 grams of the glycidyl polyether of bis-phenol, the same as that used in Example 1, was dissolved in 80 ml. of diethylene glycol monoethyl ether ("Carbitol"), then 20 ml. of water and 0.5 gram of sodium carbonate were added to this solution. Treatment of the hide with this solution was exactly as described in Example 1. A white leather with a shrinkage temperature of 79° C. and resisting detanning was obtained.

*Example 4*

The procedure of Example 1 was repeated with the exception that 0.5 gram of calcium hydroxide was used in place of sodium carbonate. The results were substantially identical to those obtained in Example 1.

*Example 5*

Pieces of the acetone dehydrated hide, amounting to about 15 grams, were placed in a solution prepared as follows: 10 grams of a glycidyl polyether of bis-phenol, described below, were dissolved in 96 ml. of diethylene glycol monoethyl ether ("Carbitol"), then 4 ml. of water and 0.5 gram of sodium carbonate monohydrate were added to this solution. The hide in contact with this solution was gently agitated for six days. At the end of this time the hide under treatment was removed and washed free of excess glycidyl polyether by immersion in two changes of acetone and then washed in running water for one day. The shrinkage temperature of this product was about 74° C. Upon allowing this product to dry in air a leather similar to that of Example 1 was obtained.

The glycidyl polyether of bis-phenol used in this example was one obtained by the condensation of epichlorohydrin with bis-phenol as described in the patent literature, for example "Polyether C" in U. S. Patent 2,643,239. The glycidyl polyether of bis-phenol had a softening point of 64–76° C. as determined by Durrans' mercury method, an equivalent weight as an epoxide of between 450 and 525, and its composition is believed to correspond to the general Formula II above in which $n$ has an average value of about two.

While in the above examples the tanning agents used were the lower molecular weight glycidyl polyethers of bis-phenol having an average composition corresponding to Formula II shown above in which $n$ was equal to or less than two, equivalent results are obtained when higher molecular weight glycidyl polyethers of bis-phenol, in which $n$ has a value greater than 2, are used.

Leather tanned according to this invention is suitable for use with any of the conventional finishing agents and processes. The process of the invention is applicable not only to the steerhide used in the above examples but also to cowhide, calfskin, in fact to any hide or skin commonly used for tannage except the fur skins. The term "hide," as used in the appended claims, includes all such hides and skins.

While in the above examples acetone dehydrated hide was used the practice of our invention is not limited to such a specially prepared raw material. Wet or moist hides, at any stage after unhairing, may be used. In such cases a part or all of the water in the organic solvent water system will be introduced with the hide. It will merely be necessary to adjust the relative quantity of solvent so that the liquid phase after the addition of the wet hide will contain a minor proportion, about four to thirty-five percent, of water.

About 0.5% of sodium carbonate or calcium hydroxide was added to the tanning solutions described in the above examples, as an alkaline solution is preferred.

A combination tannage in which tanning with the glycidyl polyether of bis-phenol either precedes or fol-

We claim:

1. A process of tanning hides comprising applying to the hides an alkaline solution containing about from 4 to 35% water, a glycidyl polyether of bis-phenol corresponding to the formula

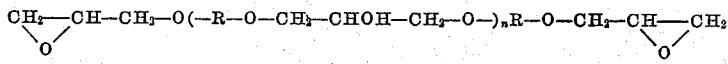

wherein R is a divalent hydrocarbon radical of the formula

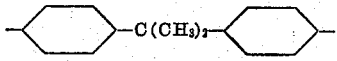

and $n$ is an integer having an average value ranging from 0 to 10, inclusive, as the tanning agent, and an inert, water-miscible organic solvent as a mutual solvent for the said water and said glycidyl polyether, until the hides are tanned.

2. The process of claim 1 wherein $n$ has an average value of 1.

3. The process of claim 1 wherein $n$ has an average value of 2.

4. The process of claim 1 wherein the water-miscible organic solvent is a monoalkyl ether of a glycol selected from the group consisting of ethylene glycol, propylene glycol, diethylene glycol, and dipropylene glycol.

5. The process of claim 4 wherein the monoalkyl ether is ethylene glycol monomethyl ether.

6. The process of claim 4 wherein the monoalkyl ether is diethylene glycol monoethyl ether.

References Cited in the file of this patent

UNITED STATES PATENTS

| | | |
|---|---|---|
| 2,687,404 | Robertson | July 5, 1951 |
| 2,730,427 | Suen | Jan. 10, 1956 |
| 2,752,269 | Condo | June 26, 1956 |